United States Patent [19]

Lippert

[11] Patent Number: 5,309,169
[45] Date of Patent: May 3, 1994

[54] VISOR DISPLAY WITH FIBER OPTIC FACEPLATE CORRECTION

[75] Inventor: Thomas M. Lippert, Princeton, N.J.

[73] Assignee: Honeywell Inc., Minneapolis, Minn.

[21] Appl. No.: 12,099

[22] Filed: Feb. 1, 1993

[51] Int. Cl.⁵ .............................................. G09G 3/02
[52] U.S. Cl. ........................................ 345/8; 345/7; 359/14; 359/632
[58] Field of Search ............... 340/705; 359/630, 632, 359/13, 14, 42, 34; 345/7, 8

[56] References Cited

U.S. PATENT DOCUMENTS

| | | | |
|---|---|---|---|
| Re. 28,847 | 6/1976 | Vizenor | 359/631 |
| 2,961,926 | 3/1955 | Hoffmeister | |
| 3,059,519 | 9/1956 | Stanton | |
| 3,787,109 | 1/1974 | Vizenor | 350/631 |
| 3,833,300 | 9/1974 | Rymes | 359/630 |
| 3,870,405 | 3/1975 | Hedges | 359/631 |
| 3,923,370 | 12/1975 | Mostrom | 359/630 |
| 4,026,641 | 5/1977 | Bosserman et al. | 359/869 |
| 4,081,209 | 3/1978 | Heller et al. | 359/631 |
| 4,153,913 | 5/1979 | Swift | 358/93 |
| 4,264,144 | 4/1981 | McCord | 359/868 |
| 4,361,384 | 11/1982 | Bosserman | 359/631 |
| 4,465,347 | 8/1984 | Task et al. | 359/400 |
| 4,508,424 | 4/1985 | Ruder | 359/630 |
| 4,755,023 | 7/1988 | Evans et al. | 359/631 |
| 4,761,056 | 8/1988 | Evans et al. | 359/631 |
| 4,859,030 | 8/1989 | Rotier | 359/631 |
| 4,886,343 | 12/1989 | Johnson | 359/53 |
| 5,032,007 | 7/1991 | Silverstein et al. | 359/53 |

Primary Examiner—Alvin E. Oberley
Assistant Examiner—Minsun Oh
Attorney, Agent, or Firm—Mark J. Gebhardt

[57] ABSTRACT

A display system for use with headgear of a user includes a visor display mounted to the headgear so as to define a cavity between the head of the user and an inner surface of the visor display. The visor display has at least one partially reflective aspheric surface section directed inward to the user. The partially reflective aspheric surface is at a position which intercepts a forward line of sight of at least one eye of the user and which is at a tilt angle with respect to a plane that is substantially transverse to the forward line of sight. A shallow packaged image source is positioned above an eye within the cavity at a predetermined angle with the plane which is substantially transverse with a forward line of sight. A fiber optic faceplate having a first and second end section is coupled to the image source at the first end section. The second end section has an aspherically shaped surface so as to project an image from the image source on the aspheric surface section of the visor display for reflection of the image to the eye of the user. The shape of the aspheric surface section being determined by a shape of the partially reflective aspheric surface, the tilt angle and the predetermined angle.

11 Claims, 3 Drawing Sheets

VISOR DISPLAY WITH FIBER OPTIC FACEPLATE CORRECTION

FIELD OF THE INVENTION

The present invention relates in general to head or helmet mounted display systems. More particularly, this invention relates to a helmet mounted display system which provides an image superimposed on a normal field of view of a user of the system utilizing a fiber optic faceplate corrector.

BACKGROUND OF THE INVENTION

Head or helmet mounted display systems find utility in many areas, such as training, machine control or entertainment. In recent years, such devices have found particular utility in military applications where information must be supplied to vehicle operators and weapons controllers. Aircraft operators find such devices useful to furnish information relating to aircraft operation, radar presentations, maps, weapons aiming and other things, such as symbols, that would be useful or desirable in their mission.

In prior devices, images from a variety of sources, including cathode ray tubes (CRTs) have been used to project images which are superimposed on a surface in the user's line of sight. Helmet mounted systems for displaying images are well known in the art. Several systems have been described in which the optics may be head mounted with a cathode ray tube and heavy collimating lenses being placed in a cylinder and mounted on either the right or left side of a pilot's helmet. This weight placement is a considerable disadvantage to the pilot.

U.S. Pat. No. Reg. 28,847 to Vizenor, presently assigned to Honeywell Inc., described a display where the helmet was provided with a paraboloidal visor with a partial reflective coating on the inner surface as the primary optical element in transmitting the image from the generating device to the eye of the observer. A light source image or a virtual image is positioned at the focal point of the inside surface of the visor.

A substantially more complex helmet display system is disclosed in U.S. Pat. No. 4,361,384 to Bosserman. This system combines a thin film flat panel display and a wafer diode image intensifier tube. A plurality of semi-transparent optical elements including a fiber optic faceplate, direct the image from the flat panel display by reflection from a visor into the eye of an observer where it can be superimposed over the images received from an exterior scene. The observer thus views the exterior scene through both the visor and by way of the flat panel display images. The visor, for reflecting purposes, can be holographic, toric, aspherical or spheric.

U.S. Pat. No. 4,761,056 to Evans et al., describes a display apparatus which includes a combination visor adapted to be attached to the headgear of a user. The visor has a viewing area segment positioned in the line of sight of the user of the headgear. An optical display generates an image and the image is reflected by a parabolic mirror in the optical path from the optical display to the visor viewing area segment. A fold mirror is positioned to receive the image from the parabolic mirror and direct the image to the visor viewing area segment. This apparently minimizes the size and curvature of the visor without affecting transmission of the image.

As is known, the ideal situation for a visor display system would include an infinitesimal image source directly in front of the eye and positioned as close as possible to the focal point of the visor leading to total reflection of an image from the image source to the visor and back to the eye. As the image sources are moved away from the ideal situation, aberrations are introduced into the system which require correction. Various systems correct for such aberrations by means of lenses in front of CRTs for refraction therethrough or as in Evans, a plurality of mirrors for improving the optical transmission and performance.

Various holographic elements which are deposited on visors of display systems have been used to correct for certain aberrations of display systems. However, as with lenses which use refraction to perfect the image, such solutions raise additional aberration problems, especially when utilized in conjunction with color image sources. Utilization of lenses to provide for aberration correction prohibit the various colors of a color image to reach desired destinations at equivalent times and with equivalent intensities. Holographic films on visors are also problematic with color images as the holographic films bend the various color components of the image at different angles.

In addition, the availability of helmet mounted display devices which are of light weight and small size is also a problem. Because the helmet of the display must be worn by an individual with many complex tasks to perform, usually under great stress and with little time in which to accomplish the tasks, the helmet should be as light and compact as possible while still providing superior optical performance. Specifically, bulky and large helmets cause their wearers to tire rapidly, thus shortening the effectiveness to the wearer. Similarly, poor images cause miscalculation as well as hinder the wearer's decision and reaction capabilities. Therefore, there is a need for further reduction in the size and weight of visor display systems. In addition, such a system should provide superior optical performance of not only a monochromatic image but also for color images.

SUMMARY OF THE INVENTION

The present invention is directed to a display system having low weight and small size and which is substantially all reflective for use with a color image source. The display system for use with headgear of a user includes a visor display mounted to the headgear so as to define a cavity between the head of the user and an inner surface of the visor display. The visor display has at least one partially reflective aspheric surface section directed inward to the user. The aspheric surface section is at a position which intercepts a forward line of sight of an eye of the user and which is at a tilt angle with respect to a plane that is substantially transverse to the forward line of sight of the user. The display system further includes a shallow packaged image source positioned above at least one eye of the user within the cavity at a predetermined angle from the plane which is substantially transverse with the forward line of sight. A fiber optic faceplate having a first end section and a second end section is coupled to the image source at the first end. The second end section has an aspherically shaped surface so as to project an image from the image source on the aspheric surface section of the visor display for reflection of the image to the eye of the user. The shape of the aspherically shaped surface is determined by a shape of the partially reflective surface, the tilt angle and the predetermined angle.

In another embodiment of the invention, the display system for use with the headgear of a user includes a visor display mounted to the headgear of the user so as to define a cavity between the user's head and an inner surface of the visor display. The visor display has a partially reflective aspheric section directed inward toward the user. The aspheric section is at a position which intercepts a forward line of sight of an eye of the user and which is at a tilt angle with respect to a plane that is substantially transverse to the forward line of sight. The display system further includes a substantially all reflective shallow packaged image source positioned above the eye within the cavity at a predetermined angle with the plane which is substantially transverse to the forward line of sight so as to project from an aspheric surface of said image source a color image on said aspheric surface section of the visor display for reflection of the color image to the eye of the user.

In yet another embodiment of the above invention, the image source of the above display system includes a shallow packaged display having a display face and a fiber optic faceplate coupled thereto having a first and second end section. The first end section is coupled to the display face of the display and the second end section has an aspherically shaped surface so as to project a color image on said aspheric section of the visor display for reflection of the color image to the eye of the user. The image source and the visor display form an all reflective system permitting the color image to reach the user with minimal aberrations. The shape of the aspherically shaped surface is determined by a shape of the partially reflective surface, the tilt angle and the predetermined angle.

DESCRIPTION OF THE PREFERRED EMBODIMENT

Figure 1:
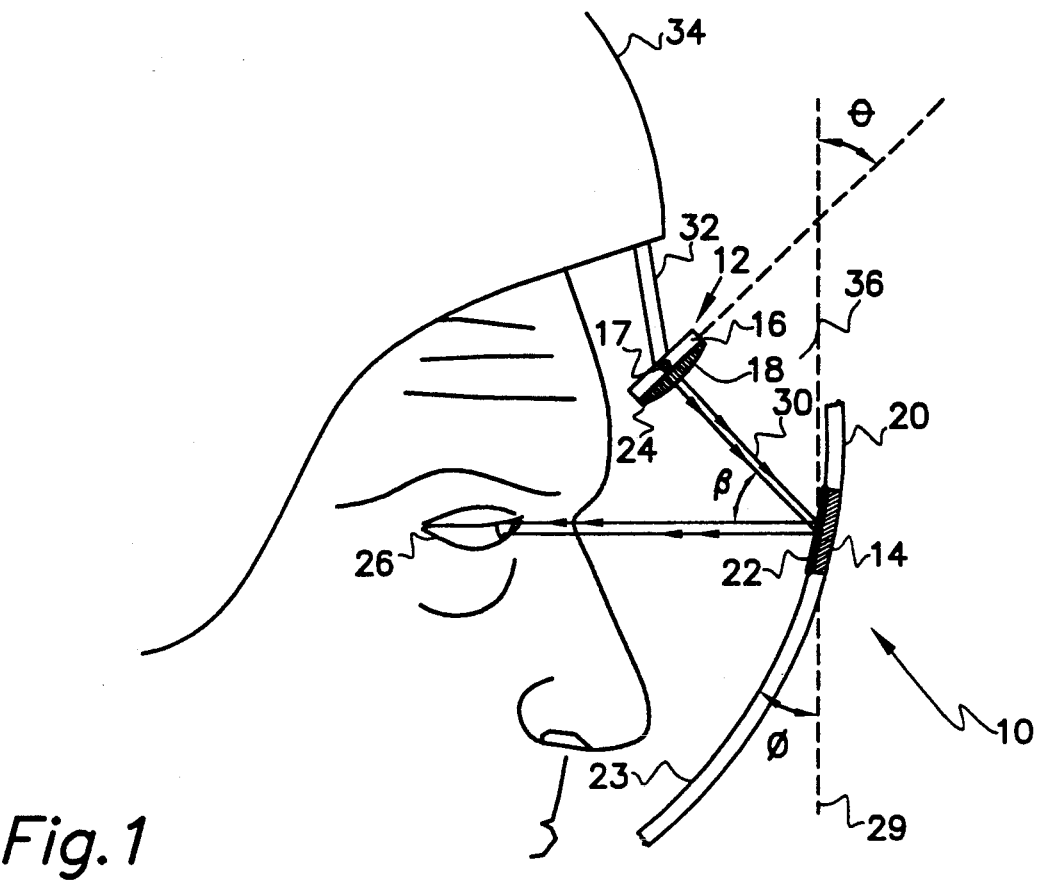
FIG. 1 is a side view of the visor display system of the present invention.
Figure 2:
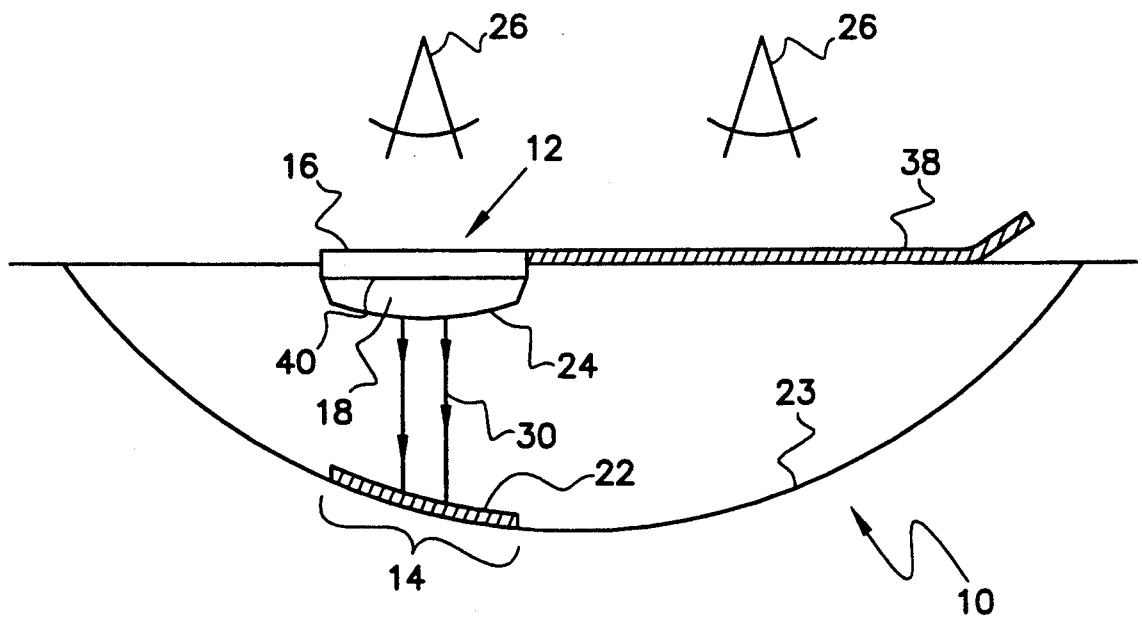
FIG. 2 is a top plan view of the visor display of FIG. 1.

In accordance with the principles of the present invention, a visor display system 10 shall be described with reference to FIGS. 1-5. Referring to FIG. 1, a visor display system 10 includes a user's headgear 34, which may be a conventional aviation helmet of standard construction. A visor 20 is shown placed in close proximity to the headgear 34 forming a cavity 36 between an inner surface 23 of the visor 20 and the face of the user. Visor 20 is a face mask or frontal piece, typically used in conjunction with a helmet, through which a user views the outside world while the user's eyes are protected. A portion of the light represented by rays 30 and projected from an image source 12 is reflected by the inner surface 23 of a partially reflective aspherical surface section 14 of visor 20. The portion of light 30 reflected is reflected parallel to the axis of the visor 20 and a collimated image will appear to the user to be superimposed at infinity on the scene of the outside world viewed through the visor 20.

The visor 20 is mounted by appropriate hardware (not shown) to headgear 34. The partially reflective aspheric section 14 of visor 20 includes a reflective film 22 deposited on the inside surface 23 of visor 20. In the preferred embodiment, the visor is toroidally shaped with a horizontal major axis as is shown by the visor toroid surface 54 of the ray trace diagram of FIG. 3. The curvature of the aspheric surface section 14 is such that the reflective surface has a definable focal point 17. The focal point of a reflective surface as used herein may be defined as that point from which rays emanating outward and striking the surface are reflected back parallel to its axis. Stated another way, the focal point may be defined by the point of convergence of a band of rays which strike the reflective surface parallel to its axis.

Although the preferred embodiments of the invention described herein each use a helmet as a means for fixing the visor to the user's head, any mounting means which allows the visor to move in consonance with normal head movements of the user so that angular relationship between the head and visor is preserved, would be acceptable for use in the applicant's invention. In addition, the shape of the visor and partially reflective aspherical section may be ellipsoidal or any other aspheric surface found to be desirable to achieve high optical performance in accordance with the present invention. Choosing other visor shapes will provide for different focal lengths and a degree of design freedom.

The aspheric surface section 14 of visor 20 is coated with a reflective film 22, such as by a vapor deposition process. Metallic films can be used as such reflective coatings, although reflective coatings of any type are usable, including metallic oxide coatings. A coating of appropriate density, as is known to those skilled in the art, will make the aspheric surface section 14 partially reflective. The amount of reflectivity as opposed to transmissiveness depends upon the particular application.

When an image source 12 is centered at the focal point 17 of the aspheric surface section 14, rays 30 emitted therefrom will strike the reflective surface and a portion of the rays 30 will be reflected substantially parallel to the axis of the visor surface. Ideally, to a user wearing headgear 34 and visor display system 10, an image projected from an infinitesimal light source 12 at focal point 17 will appear perfectly superimposed on the screen viewed through the visor 20 and will appear to be located at infinity due to substantial parallelism of the reflected rays. In a typical light source positioned at the focal point 17, rays displaced at the edges of the image source which are projected onto and reflect from the aspheric surface section 14 for superimposition on the outside scene of the user create a nonparallel effect leading to a distorted and aberration inclusive image.

The visor display system 10 is designed to form an all reflective system to produce a substantially aberration free image in a circular field of view of about 20°-25°. The image source 12 of the visor display 10 is positioned at focal point 17. Image source 12 includes a shallow packaged display 16 and a fiber optic faceplate 18 coupled to a face 40 of the display 16. The image display 16 may be a monochromatic image display or a colored image display receiving image information by way of cable 38. The image source 12 can be mounted to helmet 34 by appropriate mounting means 32 or to the visor 20 by appropriate mounting hardware (not shown). In addition, a single piece image source 12 and visor 20 assembly could be mounted on the head of a user with a molded nose piece and held by helmet suspension in removable form. Moreover, the single piece assembly could be hardmounted to the headgear 34 in a retractable form.

The image display 16, in the preferred embodiment of the invention, includes an additive/subtractive color image display as described in U.S. Pat. No. 4,886,343 to Johnson or a color display apparatus as described in related U.S. Pat. No. 5,032,007 to Silverstein et al. Although the additive/subtractive color image display is the preferred image display 16, other shallow packaged image generating means such as fiber optic image generators, liquid crystal displays, electroluminous displays, and laser diodes with scanners, etc. may also be used in this invention as optical image displays. The image display offers a degree of flexibility with regard to the design hereof. For example the display can differ in size, matrix rectangularity, etc.

In the preferred embodiment of this invention, the image source 12 includes a fiber optic faceplate 18 coupled to the display 16 to provide for a display output shape for correcting geometric distortion and aberrations of the visor display system. The fiber optic faceplate is coupled or bonded to the image display 16 in a manner which is known in the art. For example it is readily known in the art how to attach and bond a fiber optic faceplate to a CRT. A similar process is performed when attaching the fiber optic faceplate 18 to the additive/subtractive color image display 16.

The fiber optic faceplate has a substantially flat surface at one end section which is coupled or bonded to the face 40 of the image display 16. At the end section opposite the section coupled to image display 16, is a second surface 24 which provides the image output of the image source 12. The output surface 24 is a machined surface of an aspherical shape. Fiber optic faceplates are readily available from Galileo Electro Optics Corp., Sturbridge, Mass. The aspherical shaped output surface 24 is machined by diamond turning, such as the diamond turning performed by Tinsley, Inc., Richmond, Calif. After the aspheric surface 24 has been machined, the asphere is then polished. In the preferred embodiment of the invention, the geometric dimensions of the aspheric output surface 24 of the fiber optic faceplate 18 utilized for forming the output surface 24 are determined by means of ray trace modeling.

To obtain the geometric dimensions of the shape of the aspheric surface 24 of the fiber optic faceplate 18, several design variables are utilized in the ray trace modeling. These variables allow for correction of distortions and aberrations in the visor display system to be able to achieve an aspheric output surface 24 on the fiber optic faceplate 18 which can be machined and also which are utilized to minimize a fold angle B of the visor display system 10, FIG. 1. The minimization of the fold angle B increases the overall effectiveness of the optical display system. A first design variable is a tilt angle $\phi$, the angle of the aspherical section 14 with respect to a plane 29 which is transverse to the forward line of sight of the user. A second design variable angle $\theta$, is the angle of the substantially flat image display 16 with respect to the same plane 29 which is transverse to the forward line of sight. These angles, $\phi$ and $\theta$, are chosen in conjunction with the selection of the variable visor shape, toroidal in the preferred embodiment, to minimize the fold angle B of the visor system display 10.

The small and shallow packaging of the image display 16 which allows the placement of the image source 12 close to the eye 26 allows for minimization of the fold angle B. In the preferred embodiment, the image source is placed just above the eyebrow ridge in cavity 36. The shape of the aspheric surface 24 of fiber optic faceplate 18 which is coupled to the image display 16 is determined by ray trace modeling including the variables of the visor shape, tilt angle $\phi$ and angle $\theta$, to control distortions or aberrations introduced into the visor display system.

Figure 3:
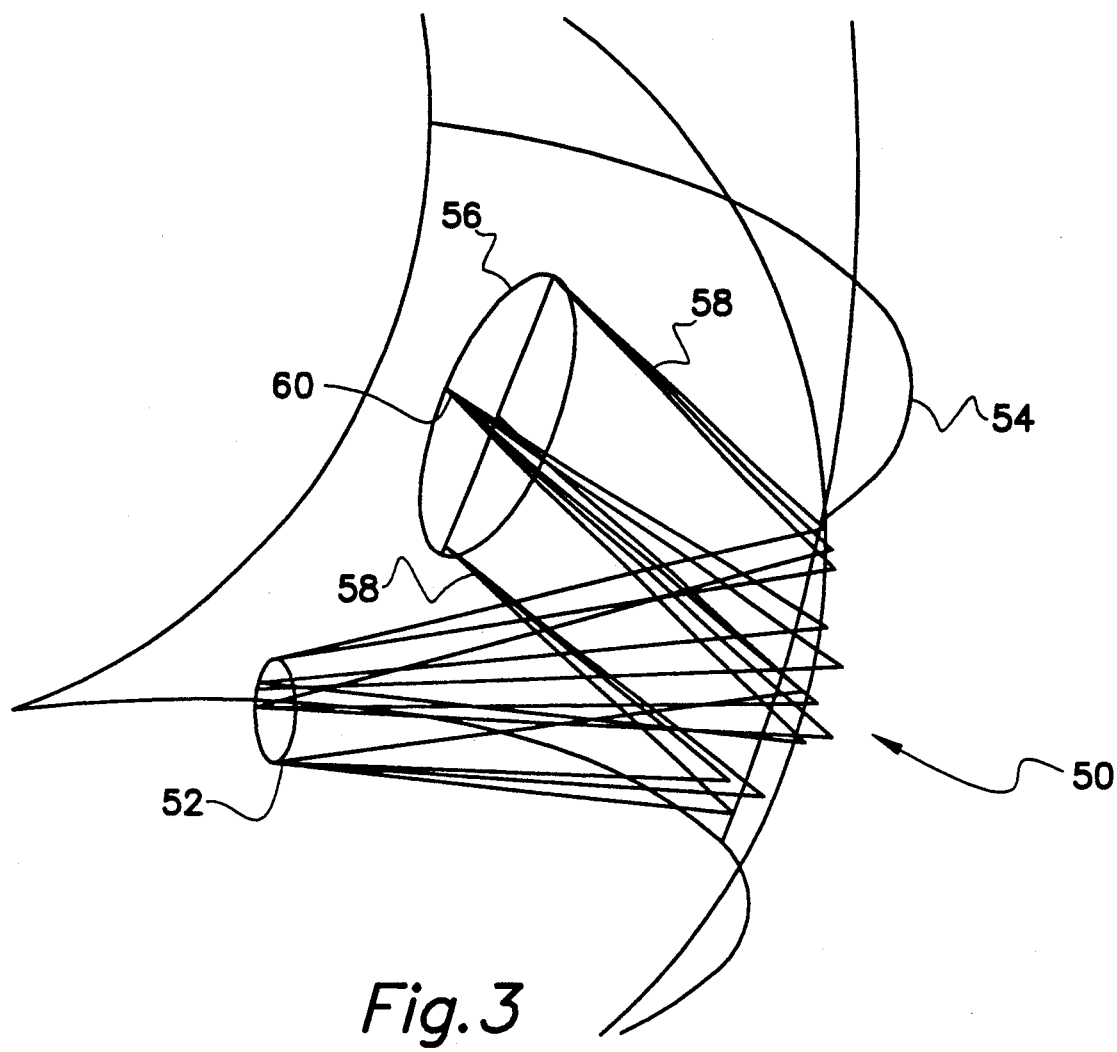
FIG. 3 is a ray trace diagram modeling the present invention as shown in FIG. 1 and FIG. 2.
Figure 4:
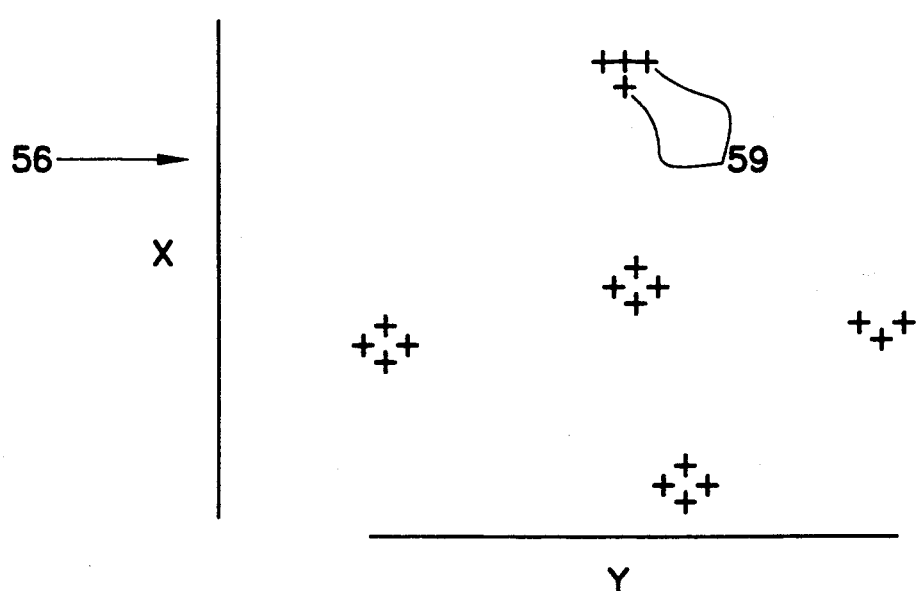
FIG. 4 is a detailed diagram of the modeled image source of the ray trace of FIG. 3.
Figure 5:
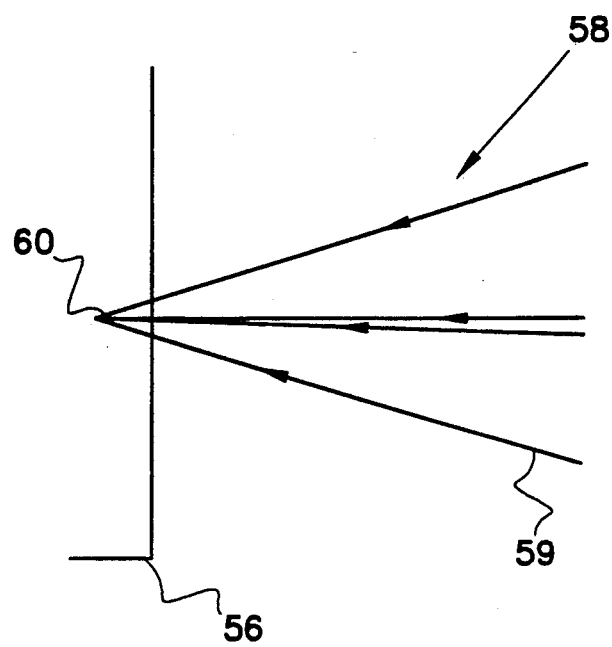
FIG. 5 is a side view of the modeled image source of FIG. 3.

A ray trace 50 for a toroidal visor surface 54 at a tilt angle $\phi$ and image source angle $\theta$ is shown in FIG. 3. Ray trace modeling is well known to those skilled in the art. The ray trace 50 includes a non-exit pupil forming area 52 of approximately 10 mm in circular shape. Parallel ray bundles 58 are projected from the non-exit pupil forming area 52 to the toroidal visor surface 54 and reflected to a flat image source 56. The flat image source is shown in a frontal view in FIG. 4 and at a side view in FIG. 5. Both FIG. 4 and FIG. 5 are detailed diagrams of the flat image source 56 of FIG. 3. As is seen from FIG. 4, the rays 59 of ray bundles 58 do not intersect at the flat image source 60 but rather intersect as shown in FIG. 4. To correct for aberrations and distortions of the optical system with the selected variables shown as in this example ray trace, the flat image source 56 must be shaped to have an aspherical surface 24 which includes the points of convergence 60, FIG. 5, of the ray bundles 58. In FIG. 5, the point of convergence 60 is shown for only one ray bundle 58 wherein the rays 59 converge behind the flat image source 56. As a plurality of these convergence points are determined, the geometric shape of the desired optical output surface of the fiber optic faceplate 18 is determined. As described above, diamond turning can then be used to shape the aspheric output surface 24 of the fiber optic faceplate 18 to substantially coincide to those geometric properties.

The display size and displayed field of view on visor 20 are principle trade offs with the tilt angle $\theta$ and predetermined angle $\phi$ which will affect the visor shape usability and productibility, the displayed distortion and field curvature. With the above design, an absolute minimum weight concept is achieved which exhibits very nearly zero visual obscuration in a 20°–25° circular field of view. Such a circular field of view is more than acceptable for displays utilized in conjunction with symbolic elements and can also be used for other images where such a field of view is acceptable.

Visor display system 10 is an all reflective system which is usable not only with a monochromatic image source, but also acceptable for a color image source. No refractive elements are utilized in the path of the image. As such, the various colored rays of a color image are reflected from the aspheric surface section 14, producing a collimated colored image which appears to the user to be located at infinity with little distortion.

The visor suitable for use in this invention may be fabricated utilizing any highly transparent durable material. If constructed of a plastic substance, the visor may be either machined, cast or injection molded. Any process which can achieve an aspherically shaped visor is satisfactory.

Figure 6:
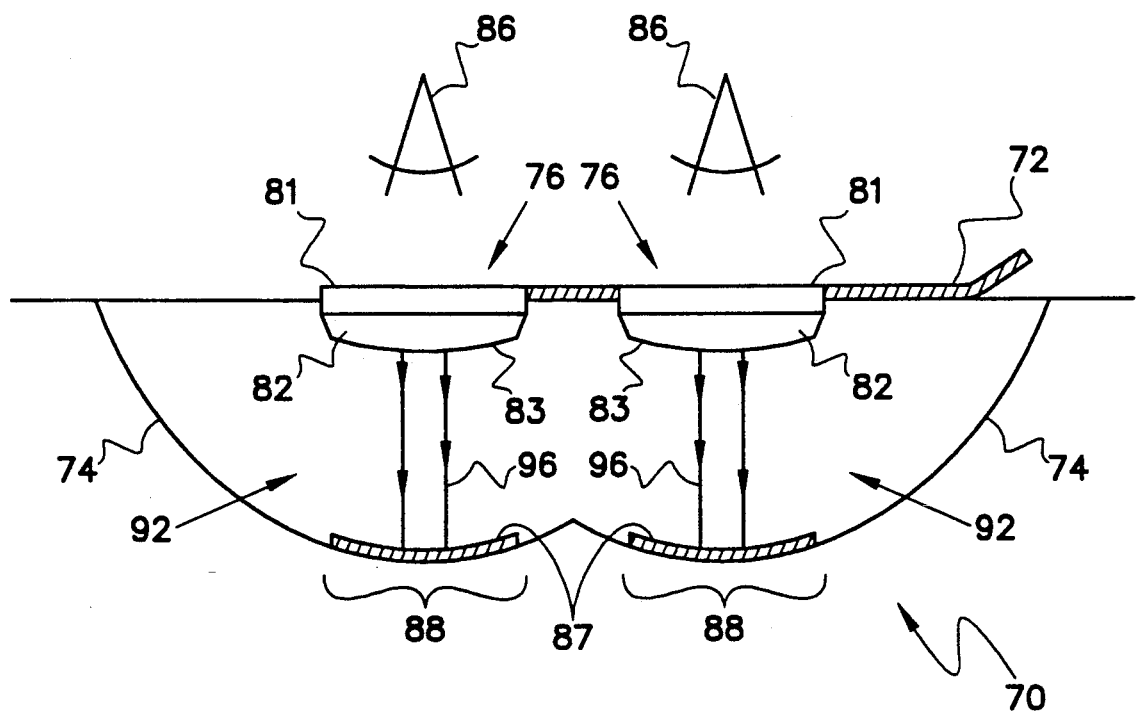
FIG. 6 is an alternative embodiment of the display system of the present invention.

In an alternative embodiment of the present invention, a biocular version 70 of the visor display system is shown in FIG. 6. The biocular version functions in much the same manner as the visor display system 10. The biocular version 70 includes a visor having two visor sections 74 forming two cavities 92. A separate image source 76 is provided for each respective eye 86. The image sources 76 are mounted in the cavities 92 above the eyes 86, preferably above the eyebrows of the user. Each image source 76 includes an image display 81 and a fiber optic faceplate 82. The faceplate is coupled at one end to the image display 81 and at the other end an aspherical surface 83 is formed in a manner like that as described for the visor display system 10. The image source 76 projects rays 96 onto an aspherical surface section 88 of each visor section 74. The aspherical surface sections 88 have a partially reflective film 87 thereon. Light of rays 96 are reflected back to the eyes 86 of the user parallel to the axis of visor sections 74. The image displays are supplied with information via cable 72. As with the visor display system 10, the aspherical surfaces 83 of fiber optic faceplates 82, the aspherical shape of visor sections 74, including the aspherically partially reflective surface sections 88, the tilt angle of the aspherical surface sections 88 and the angle of the image source 76 are selected to provide for a system capable of zero visual obscurity for a color display in a 20°–25° circular field of view.

Those skilled in the art will recognize that only preferred embodiments of the present invention have been disclosed herein, other advantages may be found and realized, and various modifications may be suggested by those versed in the art, and it should be understood that the embodiment shown herein may be altered and modified without departing from the true spirit and scope of the invention as defined in the accompanying claims.

What is claimed is:

1. A display system for use with headgear of a user, comprising:
    a visor display mounted to the headgear so as to define a cavity between the head of the user and an inner surface of the visor display, said visor display having at least one partially reflective aspheric surface section directed inward to the user, said partially reflective aspheric surface section being at a position which intercepts a forward line of sight of an eye of the user and which is at a tilt angle with respect to a plane that is substantially transverse to the forward line of sight;
    a shallow packaged image source positioned above the eye within said cavity at a predetermined angle with said plane which is substantially transverse to the forward line of sight; and
    a fiber optic faceplate having a first and second end section, said first end section coupled to said image source, said second end section having an aspherically shaped surface so as to project an image from said image source on said aspheric surface section of said visor display for reflection of said image to the eye of the user, said aspherically shaped surface being an aspherical shape determined by a shape of said partially reflective aspheric surface, said tilt angle and said predetermined angle.

2. A system according to claim 1, wherein said tilt angle and said predetermined angle are selected to minimize a fold angle of the system.

3. A system according to claim 1, wherein said visor display includes a first and second visor section defining a first and second cavity portion between each eye of the user and an inner surface of each visor section, said first and second visor sections each having a respective first and second partially reflective aspheric surface section directed inward to the user and at a position which intercepts the respective forward line of sight of each eye of the user; and
    further wherein said shallow packaged image source comprises a first and second shallow packaged image source portion, said first and second image source portions positioned above the respective eye in the respective first and second cavity portions, each shallow packaged image source portion including a fiber optic faceplate portion having a first and second end section, said first end section coupled to said respective image source portion and each respective second end section having said aspherically shaped surface so as to project said image to each said respective partially reflective aspheric surface section of said visor section for reflection of said image to the respective eye of the user.

4. A system according to claim 3, wherein each said respective partially reflective aspheric surface section of said visor display is positioned at said tilt angle with respect to said plane substantially transverse to the forward line of sight from each eye to the respective aspheric surface section and wherein each of said first and second image source portions is positioned at said predetermined angle with respect to said substantially transverse plane so as to minimize the fold angle for each respective eye.

5. A system according to claim 1, wherein said aspheric surface section is toroidal.

6. A system according to claim 1, wherein said aspherical shape of said aspherically shaped surface of said fiber optic faceplate is determined by ray trace modeling, said modeling including a plurality of infinitesimal surface area determined from the ray trace of ray bundles from a non-exit pupil forming area which are reflected from said aspheric surface section of said visor display to said image source.

7. A system according to claim 1, wherein said image is a color image and wherein said visor display, said image source and said faceplate form an all-reflective system which permits said color image to reach the user's eyes with minimal aberrations.

8. A display system for use with headgear of a user, comprising:
    a visor display mounted to the headgear so as to define a cavity between the user's head and an inner surface of said visor display, said visor display having a partially reflective aspheric surface section directed inward toward the user, said partially reflective aspheric surface section being at a position which intercepts a forward line of sight of an eye of the user and which is at a tilt angle with respect to a plane that is substantially transverse to the forward line of sight; and
    a substantially all-reflective shallow packaged image source positioned above the eye within said cavity at a predetermined angle with said plane which is substantially transverse to the forward line of sight so as to project a color image from an aspherically shaped surface of said image source on said aspheric surface section of said visor display for reflection of said color image to the eye of the user, said image source comprising:
        a shallow packaged display having a display face; and a fiber optic faceplate having a first and second end section, said first end section coupled to said display face of said display, said second end section having said aspherically shaped surface thereon so as to project said color image on said partially reflective aspheric surface section of said visor display for reflection of said colored image to the eye of said user, said aspherically shaped surface of said image source having an aspheric shape determined by a shape of said partially reflective aspheric surface, said tilt angle and said predetermined angle, whereby said image source and said visor display form an all-reflective system permitting said colored image to reach the user with minimal aberrations.

9. A system according to claim 8, wherein said tilt angle of said aspheric surface section and predetermined angle of said image source are selected so as to minimize a fold angle of the system.

10. A system according to claim 8, wherein said visor display includes a first and second visor section defining a first and second cavity portion, said visor sections having a respective first and second partially reflective aspheric surface sections thereon at a predetermined position which intercepts the respective forward line of sight of each eye of the user;

further wherein said image source includes a first and second image source portion positioned above said respective eye within said respective first and second cavity so as to project said color image on said respective partially reflective aspheric surface section of said first and second visor portions for reflection of said color image from each said image source portion to the eyes of the user.

11. A system according to claim 8, wherein said aspheric shape of said aspherically shaped surface of said image source is determined by ray trace modeling, said modeling including a plurality of infinitesimal surface areas determined from a ray trace of ray bundles from an exit pupil area which are reflected from said aspheric surface section of said visor display to said image source.

* * * * *